United States Patent [19]
Koziol

[11] Patent Number: 5,088,069
[45] Date of Patent: Feb. 11, 1992

[54] HANDLE AND TIMER ASSEMBLY FOR A BARBECUE GRILL

[75] Inventor: Walter Koziol, Antioch, Ill.

[73] Assignee: Modern Home Products Corp., Antioch, Ill.

[21] Appl. No.: 660,381

[22] Filed: Feb. 22, 1991

Related U.S. Application Data

[63] Continuation-in-part of Ser. No. 121,571, Nov. 16, 1987, Pat. No. D346,678.

[51] Int. Cl.⁵ .................. G04B 47/00; A23L 1/00; F24B 3/00
[52] U.S. Cl. .................................. 368/10; 368/98; 99/342; 126/25 R
[58] Field of Search .................... 368/10, 97–100; 99/342–344, 444–446, 419, 421 R; 126/25 R, 25 A, 25 B, 25 C, 9 R, 41 R; D10/40

[56] References Cited

U.S. PATENT DOCUMENTS

| | | | |
|---|---|---|---|
| 2,092,226 | 9/1937 | Simons, Jr. ............... | 99/419 |
| 2,192,600 | 3/1940 | Lurtz ........................ | 161/16 |
| 3,732,468 | 5/1973 | Witt et al. ................. | 307/149 |
| 3,783,769 | 1/1974 | Goodhouse et al. ..... | 99/332 |
| 3,800,777 | 4/1974 | Gebien ..................... | 126/25 R |
| 4,451,156 | 5/1984 | Kloppsteck .............. | 368/10 |
| 4,966,125 | 10/1990 | Stephen et al. .......... | 126/25 R |
| 5,003,960 | 4/1991 | Hanagan .................. | 126/39 BA |

OTHER PUBLICATIONS

1977 Charmglow Products 12 page brochure entitled "Charmglow Gas Barbeques".
Jacuzzi 2 page brochure entitled "Jacuzzi Maitre D'" showing barbecue grill units with side handles.

*Primary Examiner*—Vit W. Miska
*Attorney, Agent, or Firm*—Quarles & Brady

[57] ABSTRACT

A handle and timer assembly for a barbecue grill wherein the time that a cooking operation is taking place can be readily ascertained and is integrally mounted with a handle for opening the cover of the barbecue grill. The timing mechanism is preferably of a spring winding type and is mounted on the handle at a location spaced from the attachment to the grill. This not only affords a timing mechanism for cooking in conjunction with the grill wherein heat transfer to timing mechanism is kept to a minimum but also prevents the timing mechanism from being misplaced or inadvertently dropped as well as not being subjected to excessive heat.

15 Claims, 2 Drawing Sheets

U.S. Patent  Feb. 11, 1992  Sheet 1 of 2  5,088,069
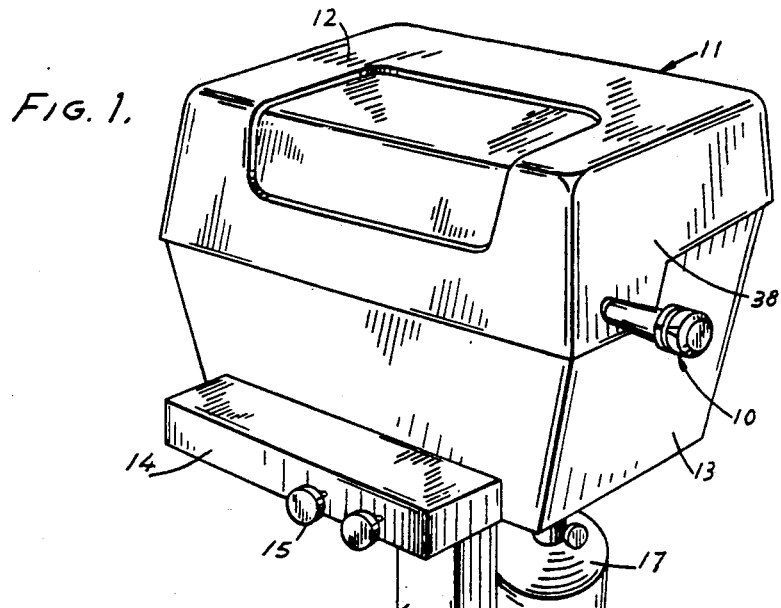
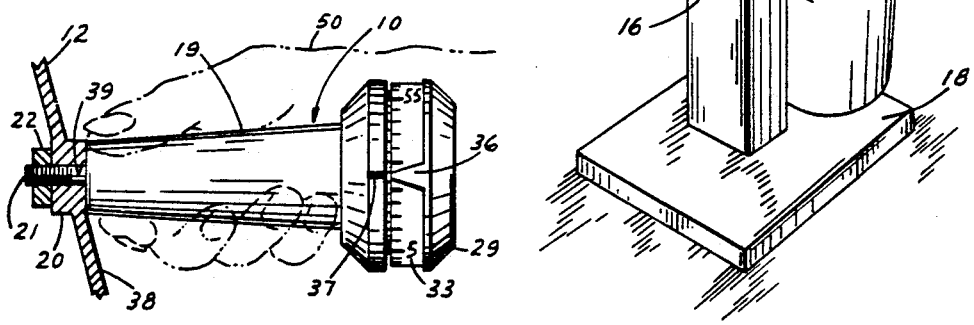
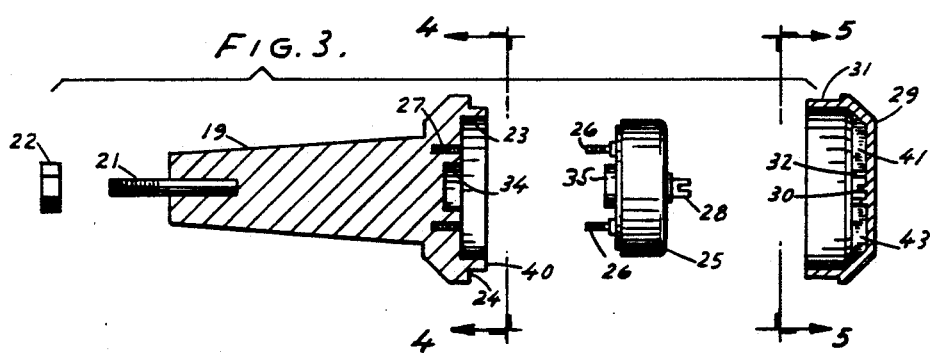
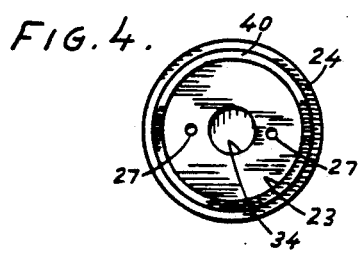
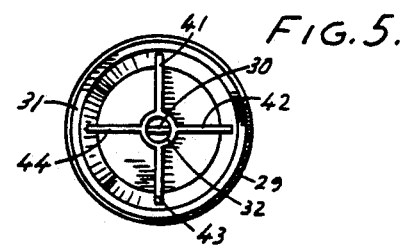

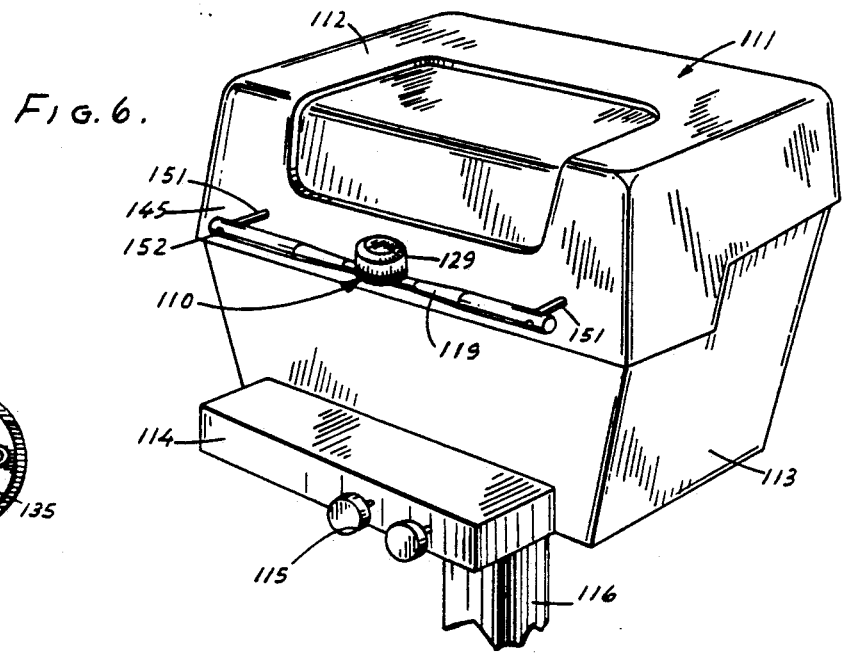
FIG. 6.
FIG. 8.
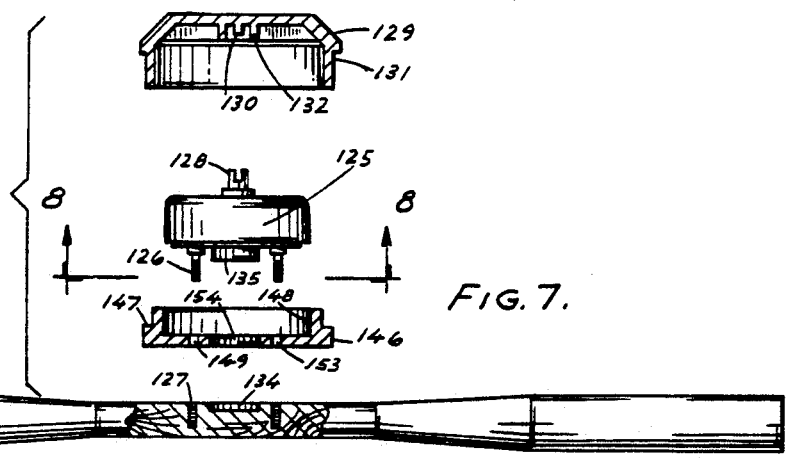
FIG. 7.
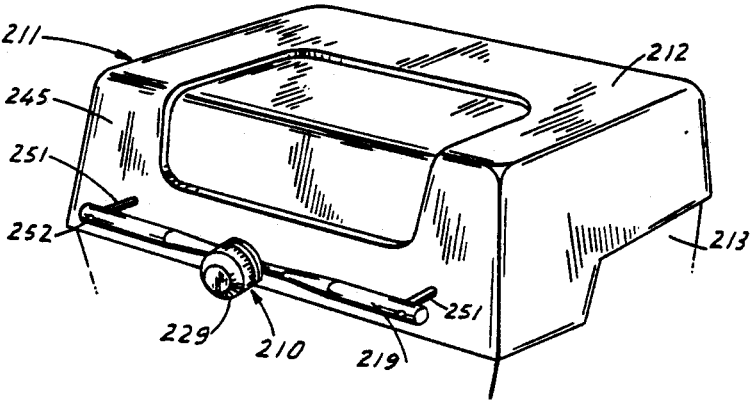
FIG. 9.

HANDLE AND TIMER ASSEMBLY FOR A BARBECUE GRILL

CROSSREFERENCE TO RELATED APPLICATION

This is a continuation-in-part of application Ser. No. 07/121,571 filed Nov. 16, 1987, now U.S. Pat. D. 346.678.

BACKGROUND OF THE INVENTION

This invention relates to a timing device for a barbecue grill unit. More particularly, the invention relates to a handle and timing assembly for a gas barbecue grill wherein a timing unit is integrally mounted in the handle for ease of observation and for prevention of mishandling or loss of the timing mechanism.

There is not readily available a timing device for barbecue grills wherein the timing unit is integrally mounted with the grill unit. There are available cooking pots or pans with mounted timing devices. For example, in U.S. Pat. No. 2,192,600, a whistling type timing mechanism is positioned in the cover of a cooking vessel. A clock escapement mechanism is utilized whereupon reverse movement moves a bar-like member 10 with an opening 11 for orientation with another opening 9 so as to produce a whistle effect at the conclusion of the timed period. A lid mounted timing device for a cooking utensil is also disclosed is U.S. Pat. No. 4,451,156. In this device, bell or alarm type mechanisms of a well-known type are enclosed in two cups 3 and 4. A window 5 is provided in an upper cup 3 having a marking and the set time of a short-time bell read on a scale provided on the lower cup 4. A timing device for cooking meat on an outdoor grill is disclosed in U.S. Pat. No. 3,732,468 and the device includes an electronic circuit adapted to approximate the usual timing of the outdoor charcoal-grill type cookery. A computer controller type cooking device is also described in U.S. 3,783,769 to determine the cooking of meat to a desired degree.

It is an advantage of the present invention to provide a timing type mechanism for a barbecue grill wherein the timing device is integrally mounted therewith.

It is another advantage of this invention to provide a combined handle and timing device for a barbecue grill wherein the timing device is readily observable.

It is yet another advantage of this invention to provide a timing device of the foregoing type which is readily associated with the grill unit yet is not adversely affected by the heat from the grill.

It is still another advantage of this invention to provide a timing mechanism for a gas barbecue grill which can be readily adapted to a handle member so that it can be produced in an economical manner.

SUMMARY OF THE INVENTION

The foregoing advantages are accomplished and the shortcomings of the prior art overcome by the handle and timer assembly for a barbecue grill as described herein. The handle and timer assembly includes a handle member having a hand gripping portion composed of heat insulating material. There are means operatively associated with the handle member to attach the handle member to an exterior wall portion of the grill. A timing mechanism of the self energizing type is connected to the handle member at a location on the handle member spaced from the attachment to the grill wall.

In one embodiment, there is an inner compartment in the handle portion and a timing mechanism of the self-energizing type is accommodated in the compartment with at least a portion of the timing mechanism secured therein. A housing member with time indicating characters thereon covers the timing mechanism to provide a timing device with the housing member arranged to rotate with respect to the handle portion.

Preferably, the housing member is partially accommodated in a recessed portion disposed adjacent to and outwardly of the inner compartment. In order to minimize exposure of the timing device to heat generated from the grill unit, the handle portion is of a length to accommodate a human hand when the hand is positioned in a finger and palm gripping position with the timing device being spaced at the end of the handle and away from the attachment to the barbecue grill cover. The handle portion is preferably of a wooden composition.

In one aspect, the housing member includes a cap portion which is arranged to enclose the timing mechanism which is of the manual, spring winding type. To accommodate the handle and timer assembly the cover of the barbecue grill can include a boss member to provide for sturdy attachment. The handle and timer assembly of this invention is especially suitable for use in conjunction with the barbecue grill which is of the gas fuel type.

In other embodiments, the timing mechanism is connected to the handle at the side of the cover of the barbecue grill or at the front of the cover. When connected at the front of the cover the timing mechanism can be positioned in an upwardly or forward position.

BRIEF DESCRIPTION OF THE DRAWINGS

A better understanding of the present handle and timer assembly will be accomplished by reference to the drawings wherein:

FIG. 1 is a perspective view of a gas barbecue grill unit showing the handle and timer assembly secured to the cover thereof.

FIG. 2 is an enlarged view in side elevation of the handle and timer assembly with a portion of the grill cover shown in vertical section as well as the means of attaching the handle assembly to the grill cover.

FIG. 3 is an assembly view of the handle and timer assembly shown in FIG. 1.

FIG. 4 is a view in vertical section taken along line 4—4 of FIG. 3.

FIG. 5 is a view in vertical section taken along line 5—5 of FIG. 3.

FIG. 6 is a view similar to FIG. 1 showing an alternative embodiment.

FIG. 7 is an assembly view of the embodiment shown in FIG. 6.

FIG. 8 is a view in vertical section taken along line 8—8 of FIG. 7.

FIG. 9 is a view similar to FIG. 1 showing yet another alternative embodiment.

DESCRIPTION OF THE PREFERRED EMBODIMENTS

Proceeding to a detailed description of the present invention and particularly referring to FIG. 1, the handle and timer assembly generally 10 is shown in conjunction with a gas-fired barbecue grill generally 11 which has the usual cover 12 mounted over the usual base 13. A control panel 14 is also provided at the lower front of the base 13 and has the control knobs 15 for controlling a gas supply from a gas supply tank 17 positioned on the base 18. A support post 16 mounts the base 13 of the grill 11 on the pedestal 18.

Referring specifically to FIGS. 2 and 3, the handle and timer assembly 10 includes a handle portion 19 preferably of a wooden composition. A boss 20 is provided on the side wall 38 of the cover 12 and has a passage 39 which will accommodate the threaded stud 21 mounted in the handle portion 19. The threaded stud 21 is engaged by the threads of the nut 22. As best seen in FIG. 3, handle portion 19 has a large diameter compartment 23 which will accommodate at least a portion of the timing mechanism 25. Timing mechanism 25 is of a standard, manual, spring winding type with the usual escapement mechanism and is readily available from the Robert Shaw Controls Co. of Waterbury Conn. Preferably, two mounting bolts 26 extend from the timing mechanism 25 and will be accommodated in the threaded portions 27 of the handle portion 19. A slotted stem 28 extends from the timing mechanism opposite the handle portion 19 for engagement with the projection 30 integrally positioned in an annulus 32 disposed inside the housing cap 29. A flange 31 circumferentially extends from the housing cap 29 and is partially accommodated by the annular recessed portion 24 provided on the handle 19 and adjacent the compartment 23.

As best seen in FIG. 4, an annular wall member 40 divides the inner compartment 23 from the outside recess 24 of the handle portion 19. A smaller diameter inner compartment 34 is also disposed in the handle portion 19 to receive a housing projection 35 of the timing mechanism 25.

FIG. 5 shows the connection of the stabilizing bars 41, 42, 43 and 44 of the housing cap 29 with the inner annular member 32. This gives rigidity to the winding projection 30 and a readily available arrangement.

FIGS. 6-9 illustrate alternative embodiments generally 110 and 210 wherein the same or similar components are indicated by the same reference numbers except in the "100" and "200" series.

Referring to FIGS. 6-8, it is seen that the handle and timer assembly 110 is positioned from the front wall 145 of the cover 112. The handle is fastened to the front wall 145 of the cover 112 in a stand off position by the standoffs 151 and the bolts 152. In this embodiment, the timing mechanism 125 and accordingly the marked housing cap 129 is positioned in an upwardly facing position. This particular embodiment employs a timer housing 146 with a recess 147 to accommodate cap flange 131. Housing 146 also has a compartment 148 with a central opening 154 and passages 149 and 153 to accommodate housing projection 135 and mounting bolts 126, therethrough.

As seen in FIG. 9 handle and timer assembly 210 is the same as timer assembly 110 except the timing mechanism (not shown but housed in housing cap 229) is positioned in a forward position as indicated by the housing cap 229.

Operation

A better understanding of the advantages of the handle and timer assembly 10 will be had by a description of its assembly and operation. As indicated in conjunction with FIG. 3, a portion of the timing mechanism 25 can be readily positioned in the compartment 23 with the threaded mounting bolts 26 secured in the threaded portions 27 and the housing projection 35 positioned in the inner compartment 34. The housing cap 29 is then positioned over the timing mechanism 25 as well as a portion of the recess 24 with the projection 30 positioned in the slotted stem 28. This engagement of the projection 30 in the slotted stem 28 will not only permit a rotation of the stem 28 by the cap 29 but also a frictional holding of the cap 29 on the timing mechanism 25. The combined timer and handle assembly 10 can then be packaged as a separate unit for later attachment to the cover 12 of the barbecue grill 11 and the mounting boss 20. Alternatively, the timer and handle assembly 10 can be mounted as an original equipment component and supplied with the grill. In either event, the combined handle and timer assembly 10 is readily attached to the side wall 38 of the grill 11 by placement on the boss 20 with the threaded stud 21 extending therethrough and attached to the inside of the cover 12 by the threaded nut 22.

When it is desired to actuate the timer mechanism 25, all that is required is a rotation of the housing cap 29 to an indicated degree so as to align the selected timing numerals 33 on the cap 29 with the reference marker stop 37 disposed on the handle 19. This movement will automatically wind the spring and an escapement mechanism in the timing mechanism 25. The cap will then rotate in an opposing direction back to a position with the pointer portion 36 on the cap 29 aligned with the reference marker stop 37. At this time a bell will sound and the operator will know that the designed time has expired. The cover 12 can be conveniently opened by means of the handle 19 and the items which have been cooked in the grill 11 may be removed or cooked for an additional period of time.

The assembly and operation of handle and timer mechanisms 110 and 210 are essentially the same as described for mechanism 10. One difference is the attachment of the timing mechanism 125 to the handles 119 and 219. This is effected by the timer housing 146 which affords connection of the timing mechanism 125 therethrough which is partially accommodated in the compartment 148 when the mounting bolts 126 are fastened into the threaded portions 127 and the housing projection 135 is accommodated in handle compartment 134.

Mechanisms 110 and 210 offer the adventage of having the timing mechanisms such as 125 and the marked housing caps 129 and 229 positioned at the front of the barbecue grills 111 and 211, respectively. This can afford easier readability.

It will be readily apparent that one of the advantages of having the combined handle and timing mechanisms is that they are utilized as a handle as well as a timing unit. The timing mechanisms are fixedly mounted in the handles 19, 119 and 219, yet are positioned away from the source of heat. This positioning is advantageous in two respects: First, the handle is disposed at the side or the front of the cover 12 such as from the walls 38 and 145 and located away from the heat source; second, the timing mechanisms and the caps 29, 129 and 229 are insulated from the barbecue grill units 11, 111 and 211 by the insulated handles 19, 119 and 219. Another important feature is the fact that the timing devices are integrally mounted to the handle so that they will not be inadvertently misplaced during the cooking operation or dropped onto a patio surface or into the cooking area of the grill.

Handles 19, 119 and 219 are preferably composed of a wooden material. However, if desired, the handles could be composed of a heat resistant plastic material or coiled metal. The housing caps 29, 129 and 229 are composed of a rigid plastic material; however, they could be composed of any suitable material. While the preferred means of attaching the handles 19, 119 and 219 to the barbecue grill 11 is with a threaded attachment such as 21 and 22, or 152 and 252, any type of suitable fastening means whether of the threaded or adhesive variety could be employed. Alternatively, in the instance of a coiled metal handle it could be welded thereto. The gas fired barbecue grill 11 is fabricated from cast aluminum. However, the handle and timing mechanism of this invention can be utilized to advantage with grills manufactured from various materials as well as grill units using various types of fuel such as charcoal.

It will thus be seen that through the present invention there is now provided a combined handle and timer assembly which will afford the ready observation of the timing device. In addition, the handle and timer assembly obviates a problem of heat coming in direct contact with the operator's hand in that it is in a spaced position from the front or side wall of the grill unit and away from the heat source during the opening of the cover. The handle and timer assembly is adaptable to various types of timing mechanisms which can be readily adapted to a handle for opening or closing a grill cover.

The foregoing invention can now be practiced by those skilled in the art. Such skilled persons will know that the invention is not necessarily restricted to the particular embodiment presented herein. The scope of the invention is to be defined by terms of the following claims as given meaning by the preceding description.

I claim:

1. A handle and timer assembly for a barbecue grill comprising:
   a barbecue grill housing defined by exterior walls;
   a handle member having a hand gripping portion composed of heat insulating material and secured to one of said walls; and
   a timing mechanism of the self energizing type connected to said handle member at a location on said handle member spaced from said attachment to said wall.

2. The handle and timer assembly of claim 1 wherein one of said exterior walls is a side wall and said handle member is attached to said side wall with said timing mechanism.

3. The handle and timer assembly of claim 1 wherein one of said exterior walls is a front wall and said handle member is attached to said front wall with said timing mechanism.

4. The handle and timer assembly of claim 3 wherein the timing mechanism is attached to a top portion of said handle member.

5. The handle and timer assembly of claim 3 wherein the timing mechanism is attached to a front portion of said handle member.

6. The handle and timer assembly of claim 1 wherein said timing mechanism is of the manual, spring winding type.

7. The handle and timer assembly of claim 1 wherein said handle portion is of a wooden composition.

8. The handle and timer assembly of claim 2 wherein said cover of said barbecue grill includes a boss member and said handle member is connected to said boss member.

9. The handle and timer assembly of claim 1 wherein said barbecue grill is of the gas type.

10. A handle and timer assembly for a barbecue grill comprising:
    a handle portion including means to connect said handle portion to a cover of a barbecue grill;
    an inner compartment at an opposing end defined by said handle portion;
    a timing mechanism of the self energizing type, said compartment constructed and arranged to accommodate at least a portion of said timing mechanism;
    means to secure said timing mechanism within said compartment; and
    a housing member having time indicating characters thereon constructed and arranged to rotate with respect to said handle portion.

11. The handle and timer assembly of claim 10 wherein said handle portion includes an outer recessed portion and said housing member is partially accommodated in said recessed portion.

12. The handle and timer assembly of claim 10 wherein said handle portion is of a length to accommodate a human hand when said hand is positioned in a finger and palm gripping position.

13. The handle and timer assembly of claim 10 wherein said housing member includes a cap housing constructed and arranged to enclose said timing mechanism positioned on said handle portion.

14. The handle and timer assembly of claim 10 wherein said timing mechanism is fixedly mounted to said handle portion and internally of said compartment.

15. A handle and timer assembly for a barbecue grill comprising:
    a handle member having a hand gripping portion composed of heat insulating material;
    means operatively associated with said handle member to attach said handle member to a wall portion of said barbecue grill; and
    a timing mechanism of the self energizing type connected to said handle member at a location on said handle member spaced from said attachment to said wall portion.

* * * * *